United States Patent Office 3,728,111
Patented Apr. 17, 1973

3,728,111
METHOD OF MANUFACTURING BILLETS FROM POWDER
Ingemar Stromblad, Vasteras, and Sven-Erik Isaksson, Robertsfors, Sweden, assignors to Allmanna Svenska Electriska Aktiebolaget, Vasteras, Sweden
Filed Sept. 21, 1971, Ser. No. 182,451
Int. Cl. B22f 1/00
U.S. Cl. 75—214                                    13 Claims

ABSTRACT OF THE DISCLOSURE

For manufacturing billets out of powder for further machining by rolling, forging or machining, powder is poured into a container having an evacuating opening and is then isostatically compressed by subjecting the container with the enclosed powder to a high extreme pressure. The billet is placed in a heated furnace and heated while it is simultaneously evacuated for degassing. After evacuation is completed, the billet is preheated in another furnace to a temperature suitable for pressure sintering and then in another furnace is subjected simultaneously to high heat and high pressure.

BACKGROUND OF THE INVENTION (1) Field of the invention

The present invention relates to a method of manufacturing billets out of powder for further machining to the desired shape by means of rolling, forging or machining.

(2) The prior art

Conventional metallurgical smelting manufacture of alloys which have a high tendency to segregate when solidifying from a liquid phase, for example high speed steel, involves very considerable difficulty. In cast state these materials have a very coarse structure and the chemical composition may vary from part to part of the same ingot. As a consequence, plastic machining by means of rolling or forging is extremely difficult to carry out. Certain alloys cannot be machined plastically at all. Furthermore, many materials still have a relatively coarse and uneven structure even after the plastic machining.. This has limited the possibilities of manufacturing on an industrial scale materials having certain compositions by conventional methods of manufacture. Experiments have therefore been carried out starting with a powder to manufacture billets to replace ingots, by enclosing the powder in a casing and sintering it under high pressure so that a homogenous, solid body is obtained. The experiments have succeeded and high speed steel, for example, has been successfully manufactured from compositions which could previously only be manufactured with great difficulty and to a limited extent by conventional methods available. Rolling or forging billets manufactured from powder has produced products of uniform and high quality. because of the homogeneity and fine-grained structure of the starting material. However, the methods of production so far have only permitted production on a limited industrial scale.

SUMMARY OF THE INVENTION

The method according to the present invention makes possible production on a large industrial scale and makes it possible to control the production process better. Thus the quality of the products manufactured can be kept higher and more uniform than previously, and the costs considerably reduced. According to the invention a billet formed from powder is enclosed in a container having an evacuating opening and is isostatically compressed by the container with the enclosed powder being subjected to a high all-sided external pressure in a pressure chamber. During this compression the evacuating opening is provided with a seal which prevents pressure medium from penetrating into the container. After compression the billet is placed in a heating furnace and the evacuating opening is connected to a vacuum pump. The billet is heated while being simultaneously degassed by means of vacuum suction, after which the evacuating opening is closed. Finally the billet is further heated and placed in a pressure furnace and subjected simultaneously to high pressure and high temperature so that the billet is further compressed and sintered.

A billet can be shaped in the normal manner by compression and then be provided with a gas-tight sleeve of sheet metal. For large cylindrical billets, for example to replace ingots for rolling, the sleeve may be used as a mould during the manufacture. The powder is poured directly into a cylindrical sleeve without a lid and packed into this sleeve during the filling process, after which it is closed with a lid which is connected in a gas-tight manner to the cylindrical part of the sleeve. From the technical point of view the shape of the billet is of no importance. However, cylindrical shape best exploits the volume of the expensive pressure sintering furnace and thus gives the lowest volume cost. It is possible, however, by this method to manufacture billets of extremely complicated shape, for example disc-shaped billets for facing cutters with projecting teeth which can only be given the exact size and shape desired by machining.

The billet is preferably heated in two stages. The billet is pre-heated while being simultaneously degassed in the first step, after which the evacuating opening is closed and it is then further pre-heated to a higher temperature suitable for pressure sintering. The pre-heating may be carried out in the same furnace, but usually it is more practical to use two separate furnaces.

A fine-grained powder has considerable surface area in relation to the material volume and thus great affinity to surrounding gases. The gases can partly be absorbed on the surface and partly form compounds with the powder comprising the material. Particularly damaging substances are oxygen ($O_2$), nitrogen ($N_2$) and hydrogen ($H_2$). The powder is manufactured in an inert atmosphere. It is often stored in an inert gas atmosphere as well. Argon is a suitable protective gas. During manufacture on an industrial scale it is practically and economically impossible to prevent the powder from coming into contact with air when the billets are being shaped. A content of 200 p.p.m. oxygen ($O_2$) or more in the shaped billet may occur, which in most cases cannot be tolerated. Satisfactory degassing of the powder in a container can be obtained if it is heated to a temperature of 300–650° C. and simultaneously degassed by means of vacuum suction. The temperature required depends both on the composition of the power and on the quantity of gases which may be permitted to remain, and also the degassing time and the pressure. Usually it is advantageous to maintain a pressure of 1 torr and below during the degassing process. For powder billets comprising an alloy based on iron, nickel or cobalt, for example an iron-based high speed steel having 0.85% C, 4% Cr, 6.3% W, 5% Mo, 3.4% V and 8.7% Co, extremely good results have been obtained with preheating of 400° C. and simultaneous degassing by means of vacuum suction at about 1 torr.

Compression of a billet prior to heating is of considerable importance for the heating time. The compression should be carried out at a pressure of at least 1000 bar, preferably between 2500 and 6000 bar, and at low temperature. Temperatures between 0–300° C. may be used. Usually the compression can be carried out at ambient temperature. With material of high speed steel type with powder grains which are sperical pressures of about 4000 bar have given good results. It has been found that, within a certain pressure range, a sudden and unexpected increase in the thermal conductivity occurs so that if compression is carried out at a pressure above this level it is possible to heat a billet to sintering temperature in less than half the time it takes to heat a billet whch has been compressed at a comparatively negligibly lower pressure, but which lies below said limit. This will be further illustrated later with reference to graphs and results of experiments.

The structure and ultimate density of the pressed product is highly dependent on the temperature at which the pressing is carried out. By a suitably selected pressing temperature a fine grain structure and high density well above 99% of the theoretical density may be achieved. The temperature must be below an upper limit which must not be exceeded from the point of view of excessive grain growth and in some cases carbide agglomeration. The temperature must also exceed a lower temperature limit in order to obtain an adequate bonding in solid state and a satisfactory ultimate density. The range between the temperature limits depends upon the material composition, the desired density and the pressure, and may vary from 25° C. to 150° C. or more.

The low thermal conductivity of a powder billet, although cold-compacted at a very high pressure, means long heating times to get the inner part of the billet heated to the selected temperature. The cycle time can, according to the invention, be considerably reduced by moving the billet from the pre-heating furnace to the pressure furnace before the interior of the body has reached the lower temperature limit above which the temperature must be to get the ultimate desired density and thereafter heating the billet in the pressure furnace during the pressure rising period to an adequate interior temperature. As the exterior parts of the billet at the start of the pressure increase in the pressure furnace already have a temperature at which the material is easily densified, the density of these parts increases almost at once and the heat transfer capacity also increases. This means that the interior will more quickly reach the temperature within the temperature range suitable for the pressing. When the selected pressure has been reached it is held at this level for a selected time.

For a material of iron-based high speed steel containing 1.24% C, 4% Cr, 6.3% W, 5% Mo, 3.4% V and 8.7% Co, good results are obtained when the sintering is carried out at a temperature of about 1100° C. and at a pressure of 1000 bar.

The container enclosing the powder is subjected to high temperature during sintering and an interchange of material may take place between the powder and the material of the container. For alloying substances having high diffusion ability such as, for example, carbon, a considerable interchange may take place. It is therefore important that the material selected for the container has approximately the same carbon activity at the sintering temperature as the material in the powder enclosed in the container. It has been found that the carbon activity for a container material of steel plate having 0.10% C, 0.20% Si and 0.35% Mn and a powder material container 0.85% C, 4.0% Si, 6% W, 5% Mo, 2% Vn and the remainder Fe is approximately the same. When the sintering takes place at 1150° C. at a pressure of 1 kbar, the alterations in the boundary layer for the powder material mentioned have been negligible.

In high pressure furnaces pressure media are required which neither destroy the containers around the powder billet nor attack the material forming the insulation layer which surrounds the furnace chamber itself, the material in the actual pressure chamber nor the material in electric resistance elements for heating the furnace. In furnaces for high temperatures, primarily furnaces for temperatures above 1300° C., resistance elements of molybdenum are often used, which is rapidly destroyed upon contact with oxygen gas ($O_2$). Inert gases must therefore be used as the pressure medium. The inert gases helium (He), argon (A) and nitrogen ($N_2$) are particularly suitable as pressure media.

BRIEF DESCRIPTION OF THE DRAWINGS

The method and equipment for carrying out the method are described further with reference to the accompanying drawings.

In the drawings.

DESCRIPTION OF THE PREFERRED EMBODIMENTS

Figure 2:
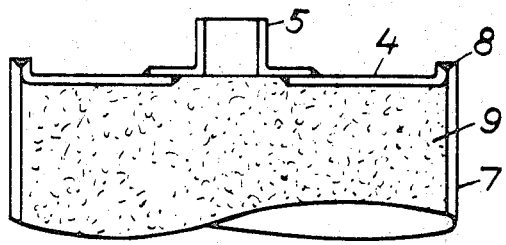
FIG. 2 shows the upper part of a container filled with powder which has been provided with a lid having an evacuating opening.

In the drawings 1 designates a storage container for powder and 2 a rotatable table which can be turned stepwise. Close to the table is a store of containers 3. An empty container 3a has been placed on the table 2 which has been moved in steps between a number of different stations. Opposite the storage container 1 is a container 3b in a filling station where it is filled with a powder from the storage container 1 through a hose or pipe 64. At the next station is a store of lids 4 with a pipe connection 5 and welding equipment 6. Here the container 3c filled with powder 9 is provided with a lid 4 which is welded to the wall 7 of the container 3 by means of a welding seam 8 as shown in FIG. 2. The container 3d is at a transfer station from which it is transferred to a testing station where the tightness of the container is checked. There are three containers 3e at this station. The checking equipment is designated 10.

Figure 1:
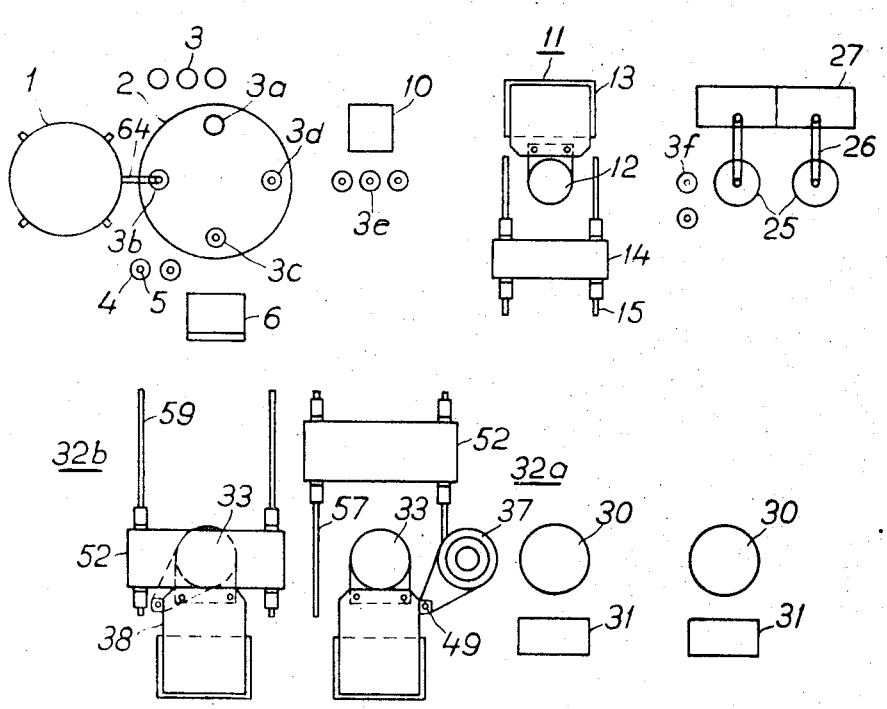
FIG. 1 shows a layout of the production equipment.
Figure 3:
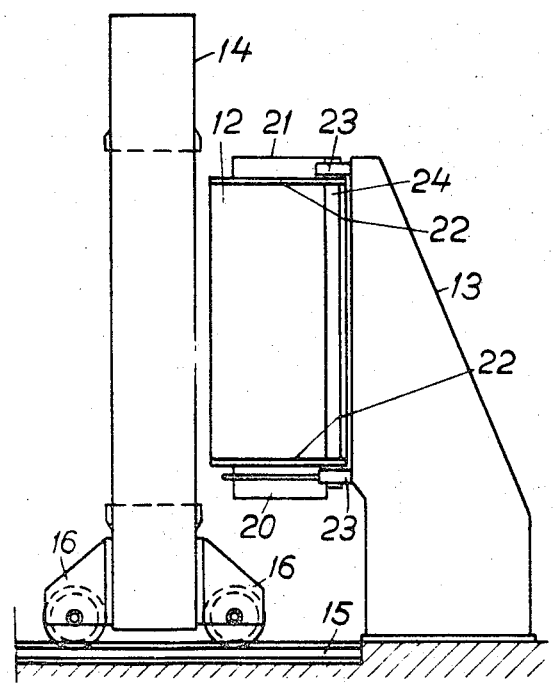
FIGS. 3 and 4 show a press for cold isostatic compression of billets.
Figure 4:
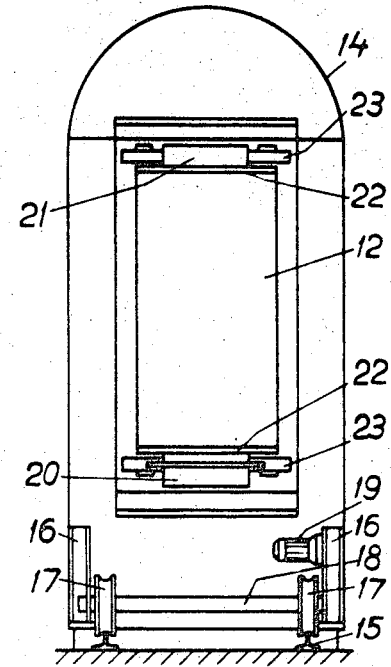

The billet, that is the filled container, is isostatically compressed in pressure equipment 11 by being inserted in a pressure chamber and subjected to high isostatic pressure. The equipment 11, which is further described in connection with FIGS. 3 and 4, consists of a high pressure container 12 supported by a stand 13 and a movable press stand 14 which runs on rails 15. The press stand 14 is of the type having two yokes and two spacers, held together by a pre-stressed strip sheath. It is carried by two pairs of brackets 16 in which the shafts 18 of the transport wheels 17 are journalled. An electric motor 19 drives the shaft 18 of one of the wheel pairs by way of a gear drive in one of the brackets 16. The transport wheels run on the rails 15. The cylinder 12 is provided with two end closures 20 and 21 projecting into the cylinder, the lower one being suspended and vertically movable to a limited extent in the cylinder 12, whereas the upper one can easily be lifted for charging and emptying the container. The container 12 is provided at its ends with flanges 22 and the stand 13 with brackets 23 having holes through which a rod 24 passes. During charging and emptying the stand is at a little distance from the press cylinder, as shown in FIGS. 1 and 3. After charging and replacement of the end closure 21, the stand is moved with the help of the motor 19 above the cylinder 12 so that their center lines coincide, after which pressure medium is introduced into the pressure chamber. The axial pressure operating on the end closures is taken up by the press stand. After the compression process, the end closures are again moved to their inner positions and the stand is moved away from the cylinder 12 so that the high pressure chamber can once again be opened, emptied and charged with a new billet to be pressed. Two finished billets 3f are beside the pressure equipment 11.

Figure 5:
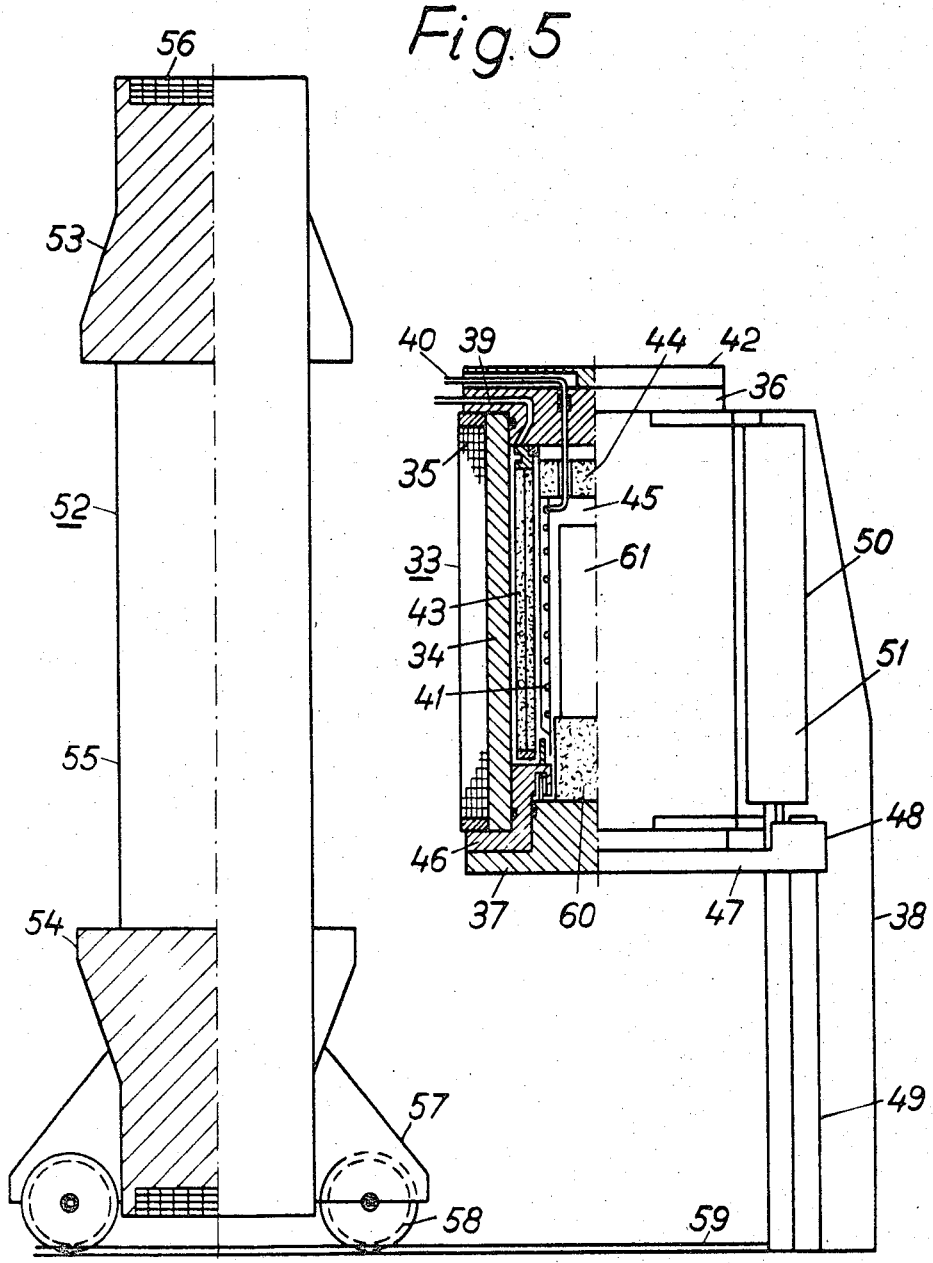
FIG. 5 shows a pressure sintering furnace.

After compression the billets are heated at atmospheric pressure while being degassed simultaneously by means of vacuum suction. Usually the heating is carried out in two stages with a pre-heating stage during which the degassing is carried out and then further heating with a completely sealed container to the temperature required for pressure sintering. FIG. 1 shows a group of pre-heating furnaces 25. The billets in the furnaces are connected to a vacuum pump 27 by way of pipe connections 5 and a conduit 26 which passes through the lids or roofs of the furnace 25. After the pre-heating, the opening in pipe connection 5 in the lid 4 of the container is closed and the billet is transferred to a furnace for further heating. There is therefore a group of final pre-heating furnaces 30 in the equipment, where the temperature can be further raised before the billet is transferred to the pressure furnace. The furnaces may be of conventional type, for example electric resistance furnaces. The auxiliary equipment of the furnaces is designated 31. After heating the billet is transferred to a pressure sintering furnace. A group of two furnaces 32a and 32b is shown in FIG. 1. These furnaces are further described with reference to FIG. 5. The furnaces are of the type shown in application Ser. No. 68,665, filed Sept. 1, 1970, now Pat. No. 3,695,597, and are thus charged from below. The furnace comprises a furnace chamber which is enclosed in a pressure chamber. This pressure chamber consists of a high pressure cylinder 33 of the type which is formed of a tube 34 and a surrounding pre-stressed strip sheath 35, an upper end closure 36 and a lower end closure 37. The cylinder is suspended in a stand 38. The upper end closure 36 remains permanently in the cylinder and is designed with a channel 39 for the supply of pressure medium and a channel for an electric cable 40 to feed electric heating elements 41 and to obtain measuring values from the thermo element. Above the end closure 36 is a plate 42 with an outlet for the cable 40. In the upper end closure 36 are an insulating sheath 43 and an insulating lid 44 which divide the actual furnace chamber 45 from the inner wall of the tube 34 and the lower surface of the end closure 36. Furthermore, the heating element 41 is suspended in the upper end closure 36. In the lower part of the tube 34 is a ring 46 projecting permanently into the tube. The lower end closure 37 is provided with a bracket 47 and a guide 48 and is vertically slidable and turnable on a guide 49. Lowering and raising is done with the help of an operating cylinder attached on the stand, the operating rod of which is connected to the guide. The pressure sintering furnace unit also includes a movable press stand to take up the forces operating on the end closures. This press stand is also of the type having two yokes 53 and 54, two spacers 55 and a strip sheath 56 holding them together. The stand is provided with brackets 57 to journal wheels 58 running on rails 59. On the end closure is a cylinder 60 of insulating material. On this stands a billet 61. During the pressure sintering the stand 52 is moved in over the high pressure chamber, during emptying and charging the stand is a little distance away from the high pressure chamber so that the lower end closure can be lowered and turned as can be seen in FIGS. 1 and 5.

Figure 6:
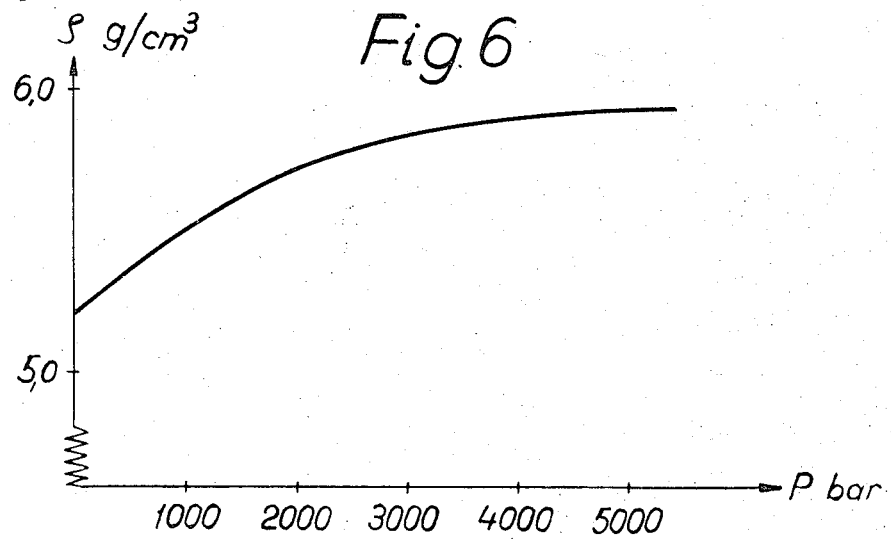
FIG. 6 is a chart showing the density of a billet of sperical powder as a function of the pressure during cold isostatic compression.
Figure 7:
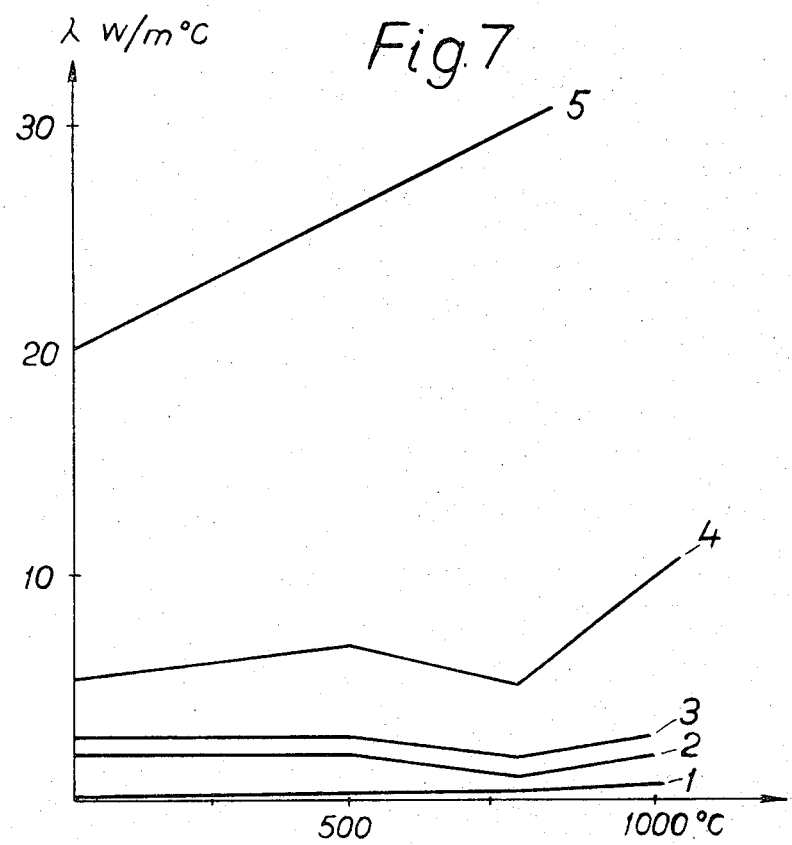
FIG. 7 shows the thermal conductivity of billets of spherical powder as a function of the temperature.

A great problem when heating a billet of powder having a large diameter is the low thermal conductivity. This is only a few percent of the thermal conductivity of a solid billet having the same composition. FIG. 6 shows the density increase upon cold compacting a billet of high speed steel consisting of so-called spherical powder. As can be seen from the graph, the density increases upon cold compression rapidly and almost linearly up to a pressure of about 2000 bar. If the pressure is increased further, however, the density increases relatively slowly. One might expect that the thermal conductivity would increase in proportion to the density and that it would therefore only be necessary to cold-compress the billet before heating at a reasonable pressure, for example 2000–2500 bar, in order to gain most of the increased thermal conductivity which can be gained. However, experiments carried out indicate that this is not the case. The thermal conductivity actually increases suddenly within a limited pressure range although the increase in density is negligible. This is illustrated in the graphs in FIG. 7 where the thermal conductivity λ is shown as a function of the temperature of billets consisting of spherical powder and cold-compressed at various pressures. Curve 1 shows the values for a billet which has not been isostatically cold-pressed, curve 2 for a billet which has been compressed at 1600 bar, curve 3 at 2500 bar and curve 5 shows the thermal conductivity of a solid billet having the same composition. The great distance between curves 3 and 4 shows that the increase of thermal conductivity at an increase of the pressure from 2500 to 4000 bar is much greater than one might expect since the density increase within this pressure interval is negligible. It is possible that, at a pressure specific for the powder concerned, there is a restructuring of the powder or a breaking up of the separate powder grains or insulating surface layers on these grains so that greater contact surface or better contact is obtained between adjacent powder grains. The technical effect of cold-pressing the billet at a pressure above a critical level for the powder is illustrated below by the values obtained upon examination of the connection between the pressure and the heating time.

Based on experiments carried out, the table indicates expected average heating times for a billet having a diameter of 450 mm. and consisting of spherical powder. The composition was 1.25% C, 4% Cr, 6.3% W, 5% Mo, 3.4% V, 8.7% Co and the remainder Fe.

|  | Heating time in hours for billets cold-pressed at— | | |
| --- | --- | --- | --- |
|  | 1,600 bar | 2,500 bar | 4,000 bar |
| Heating from 20° to 400° C. in a furnace at 660° C | 5.2 | 4.9 | 2.8 |
| Heating from 400° to 1,100° C. in a furnace at 1,150° C | 9.2 | 8.3 | 2.4 |
| Heating from 20° to 1,100° C. in furnaces as above | 14.4 | 13.2 | 5.2 |

The results of the experiments also indicated that, when sintering under similar conditions, a cold-pressure billet is heated through and sinters more rapidly and gives a better final product than a billet which has not been cold-pressed.

Figure 8:
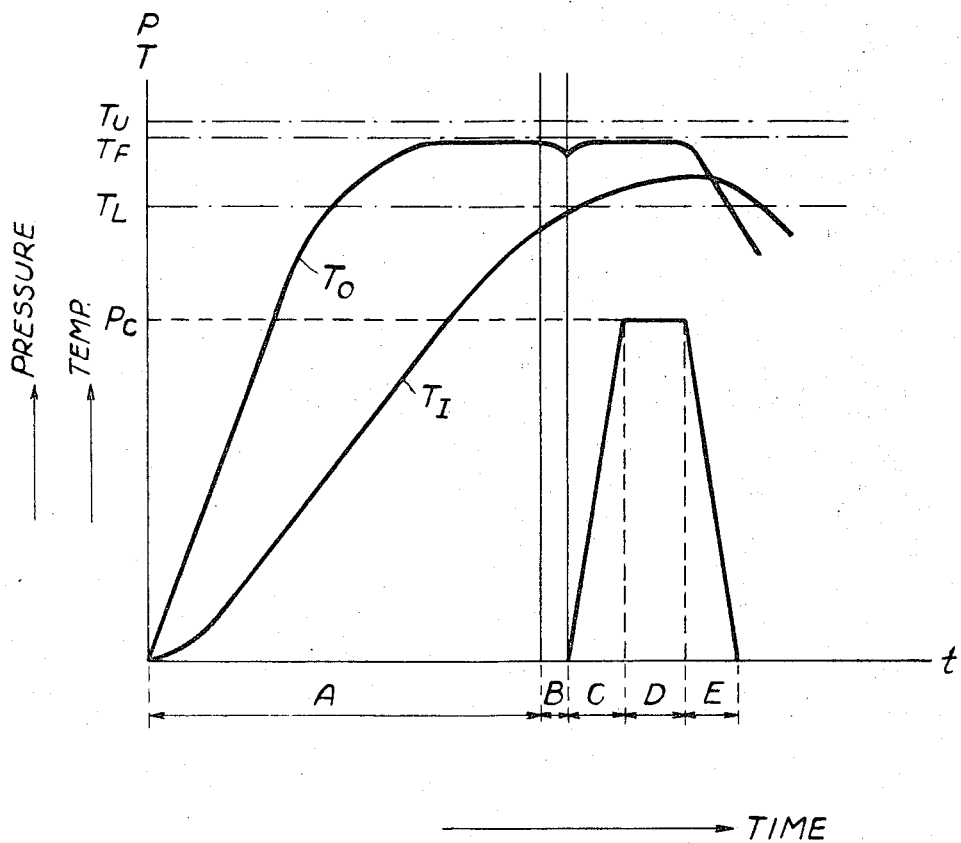
FIG. 8 shows the billet temperature at the surface, at the center and the pressure as a function of the time.

Tests have shown that cycle time can be considerably reduced by transferring the billet from the final pre-heating furnace to the pressure furnace before the interior has reached the lower temperature limit over which the temperature must be to achieve the desired density and bonding. The time reduction is higher than can be expected. The reason is probably that the outer part of the outer hottest part of the billet during the pressure increase is already so much densified that the heat transfer capacity increases. In FIG. 8 a graph illustrates the relation between billet temperature and time and container pressure and time. The temperature $T_U$ represents the upper temperature which must not be exceeded from the point of view of satisfactory grain growth. The temperature $T_L$ represents the lower temperature which must be exceeded to obtain satisfactory density and bonding under the selected pressure chamber. The temperature $T_F$ represents a selected temperature to which the billet is heated in a pre-heating furnace. This temperature is somewhat lower than $T_U$ in order to avoid all risk of overheating and giving rise to unwanted grain growth. The letter A represents the preheating time, B the time it takes to transfer a billet from the pre-heating furnace to the pressure furnace, C the time it takes to raise the pressure in the pressure furnace to a selected compacting pressure $P_C$, D the time of compacting the billet under constant pressure and E the time it takes to reduce the pressure and empty the furnace of pressure gas. The curve $T_O$ represents the outer temperature and $T_I$ the inner temperature of the same billet. As seen from the graph there is a large time delay in the temperature rise of the interior of the billet. The interior temperature determines the pre-heating time. As illustrated in the graph the billet is transferred from the pre-heating furnace to the pressure furnace before the interior temperature has reached the level $T_L$. During the transfer period, represented by B, the outer temperature $T_O$ slightly drops but the interior temperature $T_I$ still rises as long as the outer temperature $T_O$ is higher than $T_I$. The billet is further heated in the pressure furnace and the moment of transfer is so chosen that the inner temperature rises to or above the temperature level $T_L$ during the pressure rising period represented by the letter C. Then the billet is pressed at constant pressure $P_C$ during a selected period represented by the letter D. The interior temperature $T_I$ is rising also during this period. During the period represented by the letter E the pressure is lowered and the used pressure gas is pumped back to a container where it is stored.

For large billets the pre-heating takes a long time. A billet having an outer diameter of 350 mm. may be heated 8 hours or more to get the inner temperature necessary to reach the selected density at a selected pressure. The time needed depends upon material, powder type, density of the powder body, etc. and the above figure is only an example. By transferring the billet to the heated pressure furnace between the temperature $T_I$ has reached the level $T_U$ and using the pressure rising period to increase the temperature above the selected level a half to one hour or even more may be saved and the total working cycle shortened.

We claim:

1. Method of manufacturing billets, starting with a metallic powder product, which comprises:
   (a) enclosing a billet made of metallic powder in a container having an evacuating opening
   (b) isostatically compressing the billet by subjecting the container with the enclosed powder to a high, all-sided, external pressure
   (c) placing the billet in a heating furnace and connecting the evacuating opening of the container to an evacuating pump
   (d) pre-heating the billet and simultaneously degassing it by means of vacuum suction
   (e) closing the evacuating opening
   (f) further pre-heating the billet in a pre-heating furnace heated to a temperature near the allowable upper temperature limit for the material used
   (g) moving the billet to a pressure furnace before the interior of the body has reached the lower temperature limit necessary for bonding and compressing the material to its final density
   (h) raising the pressure in the pressure furnace and simultaneously heating the billet to an interior temperature above the lower temperature limit for bonding and compressing the material to substantially its final density
   (i) subjecting the billet to a pre-determined elevated pressure and high temperature during a certain period, whereby the billet is bonded and further compressed.

2. Method according to claim 1, which includes pouring powder into the container and closing the container by a lid having an evacuating opening.

3. Method according to claim 1, in which the temperature during the heating and degassing step is in the range of 300 to 650° C.

4. Method according to claim 3, in which the powder is an alloy of iron, nickel or cobalt.

5. Method according to claim 1, in which the isostatic compression before degassing is carried out at a temperature of less than 300° C.

6. Method according to claim 5, in which the billet consists essentially of sperical powder and in which the isostatic compression is carried out at a pressure of 2500 to 6000 bar.

7. Method according to claim 1, in which the isostatic compression at the high temperature is carried out at a pressure of at least 1000 bar.

8. Method according to claim 1, in which the billet comprises an iron-based high speed steel having about 1.25% C, 4% Cr, 6.3% W, 5% Mo, 3.4% V and 8.7% Co, and is isostatically compressed at a pressure of 4000 bar before heating and degassing.

9. Method according to claim 1, in which the powder is of a high speed steel having about 1.25% C, 4% Cr, 6.3% W, 5% Mo, 3.4% V and 8.7% Co and in which the heating before closing the evacuation opening is sufficient to raise the temperature to at least 300° C. at the center of the billet.

10. Method according to claim 1, in which the billet comprises an iron-based high speed steel having about 1.25% C, 4% Cr, 6.3% W, 5% Mo, 3.4% V and 8.7% Co, is sintered at a temperature of 1050–1175° C. and a pressure of at least 1000 bar.

11. Method according to claim 1, in which the container consists of sheets of a material having approximately the same carbon activity as the powder enclosed.

12. Method according to claim 1, in which the sintering is carried out in an atmosphere of inert gas.

13. Method according to claim 12, in which the sinterring is carried out in an atmosphere of argon (A), helium (He) or nitrogen ($N_2$).

References Cited

UNITED STATES PATENTS

| | | | |
|---|---|---|---|
| 3,531,280 | 9/1970 | Iler et al. | 75—226 |
| 3,525,611 | 8/1970 | Chay | 75—226 |
| 3,525,610 | 8/1970 | Meadows | 75—226 |
| 3,419,935 | 1/1969 | Pfeiler et al. | 75—226 |
| 3,341,325 | 9/1967 | Cloran | 75—226 |
| 3,356,495 | 12/1967 | Zima et al. | 75—226 |

FOREIGN PATENTS

| | | | |
|---|---|---|---|
| 781,083 | 8/1957 | Great Britain | 75—226 |

BENJAMIN R. PADGETT, Primary Examiner

B. HUNT, Assistant Examiner

U.S. Cl. X.R.

75—211, 225, 226